US009894323B2

(12) United States Patent
Narasimhan et al.

(10) Patent No.: US 9,894,323 B2
(45) Date of Patent: *Feb. 13, 2018

(54) SYSTEMS AND METHODS FOR PROVIDING INTERACTIVE VIDEO SERVICES

(71) Applicant: Yinzcam, Inc., Pittsburgh, PA (US)

(72) Inventors: Priya Narasimhan, Pittsburgh, PA (US); Rajeev Gandhi, Pittsburgh, PA (US)

(73) Assignee: YINZCAM, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,780

(22) Filed: Aug. 6, 2015

(65) Prior Publication Data

US 2015/0350692 A1 Dec. 3, 2015

Related U.S. Application Data

(63) Continuation of application No. 12/696,585, filed on Jan. 29, 2010, now Pat. No. 9,137,495.
(Continued)

(51) Int. Cl.
*H04H 20/71* (2008.01)
*H04H 60/09* (2008.01)
(Continued)

(52) U.S. Cl.
CPC ........ *H04N 7/17318* (2013.01); *H04H 20/38* (2013.01); *H04H 20/57* (2013.01); *H04H 20/63* (2013.01); *H04H 60/92* (2013.01); *H04L 65/4092* (2013.01); *H04L 65/605* (2013.01); *H04N 7/181* (2013.01); *H04N 21/2143* (2013.01); *H04N 21/2187* (2013.01); *H04N 21/21805* (2013.01); *H04N 21/2225* (2013.01); *H04N 21/2393* (2013.01); *H04N 21/234363* (2013.01); *H04N 21/25875* (2013.01); *H04N 21/4126* (2013.01); *H04N 21/41407* (2013.01); *H04N 21/437* (2013.01); *H04N 21/4524* (2013.01); *H04N 21/4622* (2013.01); *H04N 21/478* (2013.01); *H04N 21/4722* (2013.01); *H04N 21/47202* (2013.01);
(Continued)

(58) Field of Classification Search
CPC .................. H04W 4/00–4/02; H04N 2101/00
See application file for complete search history.

(56) References Cited

U.S. PATENT DOCUMENTS 5,105,183 A 4/1992 Beckman
5,513,384 A 4/1996 Brennan et al.
(Continued)

FOREIGN PATENT DOCUMENTS

GB 2288300 A 10/1995
WO 0054554 A1 9/2000
(Continued)

*Primary Examiner* — San Htun
(74) *Attorney, Agent, or Firm* — The Webb Law Firm

(57) ABSTRACT

An apparatus includes a plurality of content sources providing content relevant to an event at a venue, one or more wireless access points positioned at the venue, a plurality of servers distributing the content signals to the wireless access points, and a plurality of wireless communication devices, each using a browser to retrieve the content through one of the wireless access points. A method performed by the apparatus is also provided.

19 Claims, 7 Drawing Sheets

Related U.S. Application Data

(60) Provisional application No. 61/148,874, filed on Jan. 30, 2009.

(51) Int. Cl.

| | | |
|---|---|---|
| *H04N 7/173* | (2011.01) | |
| *H04N 21/214* | (2011.01) | |
| *H04N 21/2187* | (2011.01) | |
| *H04N 21/239* | (2011.01) | |
| *H04N 21/2343* | (2011.01) | |
| *H04N 21/2225* | (2011.01) | |
| *H04N 21/437* | (2011.01) | |
| *H04N 21/4722* | (2011.01) | |
| *H04N 21/81* | (2011.01) | |
| *H04H 20/38* | (2008.01) | |
| *H04H 20/57* | (2008.01) | |
| *H04H 20/63* | (2008.01) | |
| *H04H 60/92* | (2008.01) | |
| *H04N 7/18* | (2006.01) | |
| *H04N 21/218* | (2011.01) | |
| *H04N 21/258* | (2011.01) | |
| *H04N 21/41* | (2011.01) | |
| *H04N 21/414* | (2011.01) | |
| *H04N 21/45* | (2011.01) | |
| *H04N 21/462* | (2011.01) | |
| *H04N 21/472* | (2011.01) | |
| *H04N 21/478* | (2011.01) | |
| *H04N 21/488* | (2011.01) | |
| *H04N 21/61* | (2011.01) | |
| *H04N 21/643* | (2011.01) | |
| *H04L 29/06* | (2006.01) | |
| *H04N 21/20* | (2011.01) | |

(52) U.S. Cl.
CPC ..... *H04N 21/4886* (2013.01); *H04N 21/6131* (2013.01); *H04N 21/6181* (2013.01); *H04N 21/64322* (2013.01); *H04N 21/8133* (2013.01); *H04N 2021/225* (2013.01)

(56) References Cited

U.S. PATENT DOCUMENTS

| | | |
|---|---|---|
| 5,600,368 A | 2/1997 | Matthew, III |
| 5,729,471 A | 3/1998 | Jain et al. |
| 5,894,320 A | 4/1999 | Vancelette |
| 5,946,635 A | 8/1999 | Dominguez |
| 6,078,954 A | 6/2000 | Lakey et al. |
| 6,097,441 A | 8/2000 | Allport |
| 6,385,772 B1 | 5/2002 | Courtney |
| 6,492,997 B1 | 12/2002 | Gerba et al. |
| 6,564,380 B1 * | 5/2003 | Murphy ............. H04N 7/147 348/207.11 |
| 6,681,398 B1 | 1/2004 | Verna |
| 6,697,103 B1 | 2/2004 | Fernandez et al. |
| 7,010,492 B1 | 3/2006 | Bassett et al. |
| 7,086,081 B2 | 8/2006 | Martinez et al. |
| 7,124,425 B1 | 10/2006 | Anderson, Jr. et al. |
| 7,149,549 B1 | 12/2006 | Ortiz et al. |
| 7,210,160 B2 | 4/2007 | Anderson, Jr. et al. |
| 7,376,388 B2 | 5/2008 | Ortiz et al. |
| 7,444,165 B2 | 10/2008 | van Rooyen |
| 7,593,687 B2 | 9/2009 | Anderson, Jr. et al. |
| 7,620,426 B2 | 11/2009 | Ortiz et al. |
| 7,657,920 B2 | 2/2010 | Arseneau et al. |
| 7,859,597 B2 | 12/2010 | Anderson, Jr. et al. |
| 8,090,321 B2 | 1/2012 | Ortiz et al. |
| 8,239,910 B2 | 8/2012 | Anderson, Jr. et al. |
| 8,253,865 B2 | 8/2012 | Anderson, Jr. et al. |
| 2002/0069419 A1 | 6/2002 | Raverdy et al. |
| 2002/0144262 A1 | 10/2002 | Plotnick et al. |
| 2002/0176000 A1 * | 11/2002 | Katayama ......... H04N 7/17318 348/157 |
| 2003/0112354 A1 | 6/2003 | Ortiz et al. |
| 2003/0172375 A1 | 9/2003 | Shaw et al. |
| 2005/0262539 A1 | 11/2005 | Barton et al. |
| 2005/0272445 A1 | 12/2005 | Zellner |
| 2006/0023683 A1 | 2/2006 | Lee et al. |
| 2007/0021058 A1 | 1/2007 | Arseneau et al. |
| 2007/0197247 A1 * | 8/2007 | Inselberg ............... G06Q 30/02 455/517 |
| 2007/0204294 A1 * | 8/2007 | Walker ................... H04L 12/18 725/38 |
| 2008/0039135 A1 * | 2/2008 | Nakamura .......... H04H 20/103 455/556.1 |
| 2008/0133767 A1 * | 6/2008 | Birrer ................. H04L 65/4076 709/231 |
| 2008/0189752 A1 | 8/2008 | Moradi et al. |
| 2008/0192116 A1 * | 8/2008 | Tamir .................... G06T 7/2093 348/157 |
| 2009/0017749 A1 | 1/2009 | Braun |
| 2009/0254960 A1 * | 10/2009 | Yarom .............. G06F 17/30781 725/115 |
| 2009/0265278 A1 * | 10/2009 | Wang ...................... G06F 21/10 705/54 |
| 2009/0290024 A1 * | 11/2009 | Larson ............... H04N 1/00132 348/159 |
| 2010/0146076 A1 | 6/2010 | Adriazola et al. |

FOREIGN PATENT DOCUMENTS

| | | |
|---|---|---|
| WO | 2006085844 A1 | 8/2006 |
| WO | 2007115392 A1 | 10/2007 |

\* cited by examiner

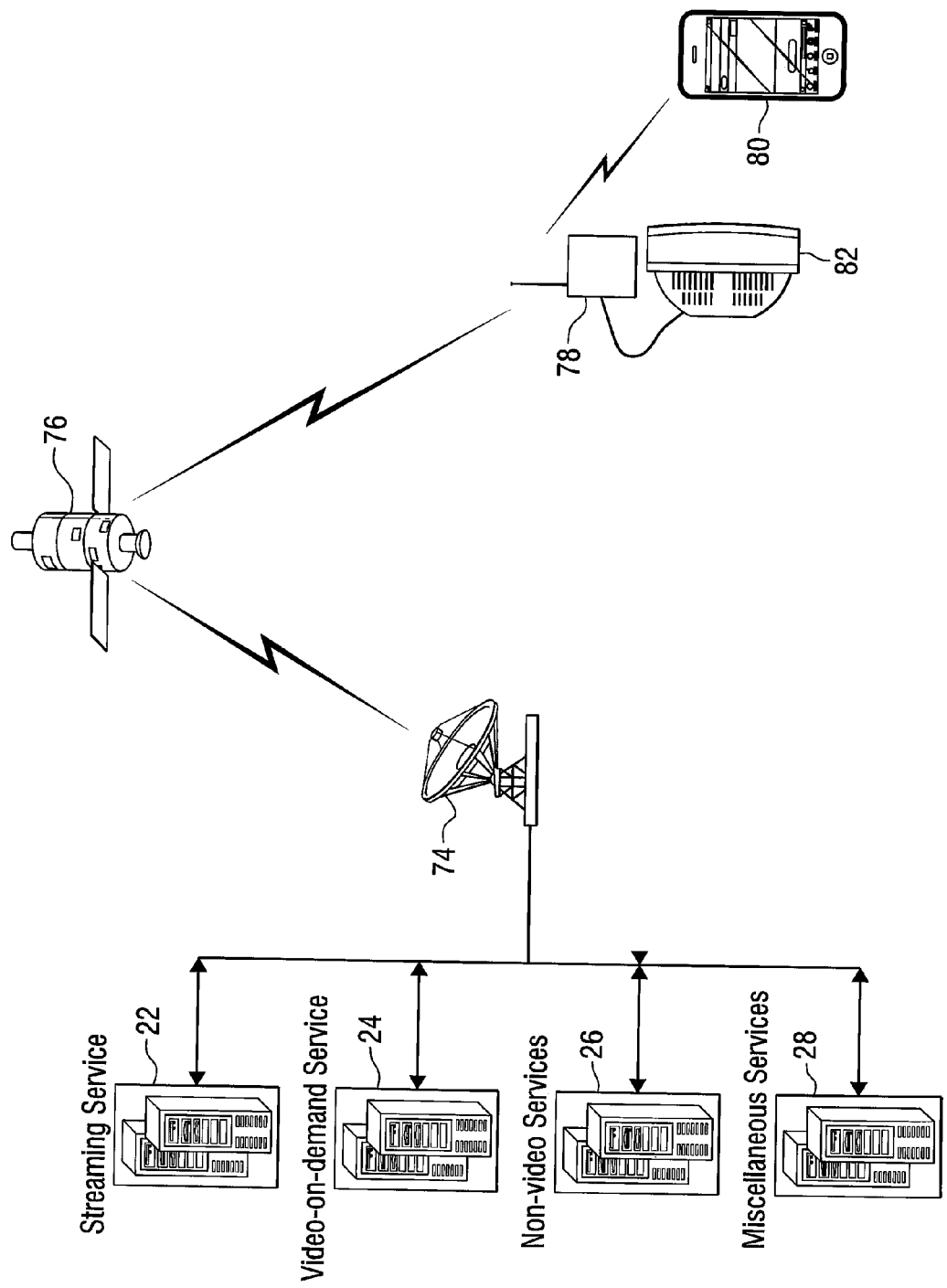

SYSTEMS AND METHODS FOR PROVIDING INTERACTIVE VIDEO SERVICES

CROSS-REFERENCE TO RELATED APPLICATIONS

This application is a continuation of and claims the benefit of U.S. patent application Ser. No. 12/696,585, filed Jan. 29, 2010, and titled "Systems and Methods for Providing Interactive Video Services," which claims the benefit of U.S. Provisional Patent Application Ser. No. 61/148,874, filed Jan. 30, 2009, and titled "Systems and Methods for Providing Interactive Video Services", both of which are hereby incorporated by reference.

BACKGROUND OF THE INVENTION

Field of the Invention

Attending sporting events in stadiums, arenas, and other similar venues is a popular pastime in the United States and abroad. Such venues typically comprise a playing area (e.g., a field or rink) that is at least partially surrounded by tiered levels of spectator seating. Spectator's ability to satisfactorily experience sporting events in such settings depends largely on the distance and angle from which the sports activity is viewed. Seats in the highest tiers above the playing area generally provide a low viewing quality due to their distance from the playing area, and while seats in the lowest tiers typically provide a more intimate viewing experience, the viewing angle relative to the sports activity may be less than optimal at times. This is particularly true for fast-paced sports, such as ice hockey, for example, where changes in the angle of the sports activity relative to spectators, and thus changes in the optimal viewing angle, are frequent and rapid. Although some venues include large-screen television displays (e.g., JumboTron displays) for re-playing recorded sports activity from different perspectives, the camera angles for providing replay footage are frequently limited and may not represent the optimal viewing angle, or the viewing angle preferred by a particular spectator.

SUMMARY OF THE INVENTION

In one aspect, the invention provides an apparatus including a plurality of content sources providing content relevant to an event at a venue, one or more wireless access points positioned at the venue, a plurality of servers distributing the content signals to the wireless access points, and a plurality of wireless communication devices, each using a browser to retrieve the content through one of the wireless access points. A method performed by the apparatus is also provided.

In another aspect, the invention provides a method including: receiving content relevant to an event at a venue from a plurality of content sources, distributing the content to a plurality of wireless access points at the venue, and using browsers in a plurality of wireless communication devices to receive content through one of the wireless access points.

BRIEF DESCRIPTION OF THE DRAWING(S)

FIG. 9 is a schematic representation of another embodiment of the invention.

DESCRIPTION OF THE INVENTION

Embodiments of the present invention are directed generally and in various embodiments to systems and methods for providing interactive video services and other related services via a wireless communication device, such as a Wi-Fi enabled mobile telephone. By way of example only, certain embodiments are described herein in connection with the provision of interactive video services and other related services via wireless communication devices of spectators viewing a live sporting event. As will be appreciated from the description that follows, the services allow each spectator to customize his or her viewing and interactive experiences while maintaining the transparency of underlying technical details. It will further be appreciated that embodiments of the present invention are not limited to uses at sports venues, and that embodiments of the present invention may also be used in other contexts, such as, for example, home entertainment applications, movie theatre applications, recreational applications, patient care applications, and security applications.

System Architecture

Figure 1:
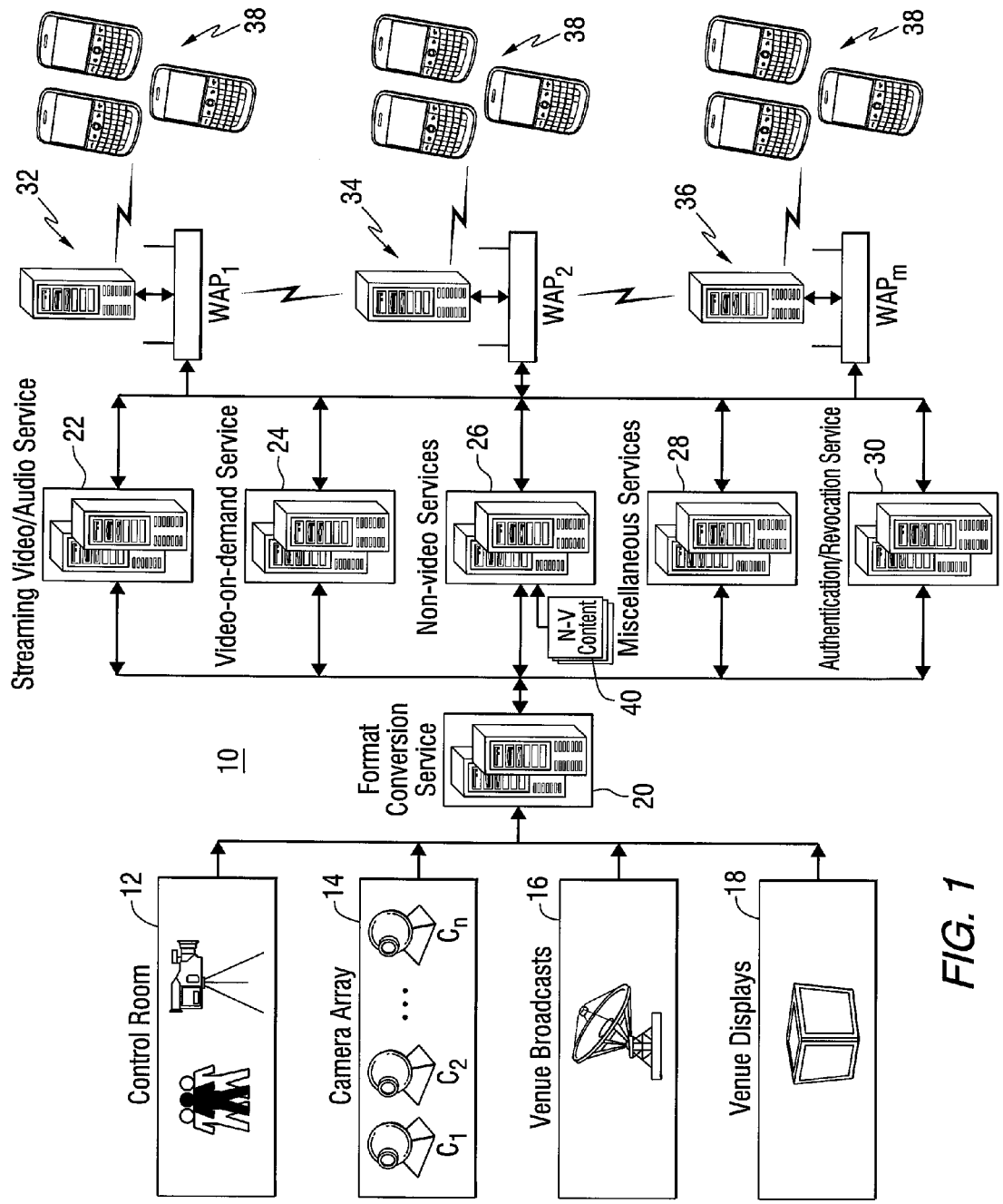
FIG. 1 illustrates a system according to one embodiment.

FIG. 1 illustrates one embodiment of a system 10 for providing interactive video services and other related services via wireless communication devices. The system includes a plurality of content sources such as a control room 12, an array of cameras 14, venue broadcasts 16, and venue displays 18. For at least one of the services, content signals are converted to a suitable format, for example by a format converter 20. The converted signals can be used in a plurality of services that may include a streaming video/audio service 22, a video-on-demand service 24, non-video services 26, miscellaneous services 28 and an authentication/revocation service 30. Signals that implement these services are sent to one or more wireless access points 32, 34 and 36. Users can then access content from the wireless access points, using wireless communication devices 38. The wireless communication devices may include mobile phones, PDA's, etc. In one embodiment, the wireless communication devices include a browser that accesses pages from one of the wireless access points. The non-video service can receive non-video content from various non-video content providers 40.

In certain embodiments and as described by way of example herein, the system may be associated with a sports venue (e.g., a hockey arena), and the services may be accessed, concurrently and in connection with a sporting event at the venue, via wireless communication devices respectively associated with spectators attending the event. The services may be selectively accessible from a browser of each wireless communication device via a wireless communication network and may comprise, for example, a streaming video/audio (SVA) service, a video-on-demand (VOD) service, one or more non-video services, and one or more miscellaneous services. To enable the exchange of service-based content via the wireless communication network, the system may comprise one or more wireless access points (WAPs) positioned throughout the venue. In one embodiment, the wireless communication network may be a Wi-Fi communication network, in which case the WAPs and the wireless communication devices may be Wi-Fi enabled devices configured to communicate using, for example, the IEEE 802.11 family of communication standards.

The wireless communication devices may include, but are not limited to: Wi-Fi enabled PDAs, mobile phones, laptop computers, desktop computers, touchscreen computers, etc. These devices are unmodified. That is, they can retrieve content from the wireless access points using the WiFi capability that found in commercial off-the-shelf versions of such devices. In addition, the services shown in FIG. 1 are platform agnostic. That is they can be implemented using various types of known hardware and software.

Furthermore, the format-converted multimedia in-venue data sources are physically resident at specific places in the network, and the users, through their wireless communication devices, view/access one of these "virtual" data sources/services one at a time through a "pull" mechanism without the multimedia data streams needing to be located on or broadcast to the wireless communication devices themselves. That is, the system of FIG. 1 does not broadcast the content directly to the wireless communication devices. Thus the content does not need to be stored on (or located on) the user's devices.

As a simple extension of the system of FIG. 1, the content need not be hosted on a server. Instead, content from the different data sources may simply be made available for users to access through their browsers, without intermediate format conversions, if the devices don't warrant format conversion.

As shown in FIG. 1, each wireless communication device may be associated with a single WAP and receive service-based content therefrom. As discussed in further detail below, the association of a particular WAP and a wireless communication device may be determined in accordance with a distributed protocol implemented across the WAPs. Accordingly, the WAPs may be configured to exchange information with each other in connection with the distributed protocol using, for example, the wireless communication network.

Referring again to FIG. 1, the system may comprise one or more content sources for outputting content to the services. Generally, the content sources may output any type of audio-visual (AV) content consumable by users of the wireless communication devices, such as, for example, video (including single image) content, audio content, graphic content and text content. In certain embodiments, for example, video and/or audio content accessed through by the SVA and VOD services may be derived from one or more of a control room content source (e.g., control room video footage and/or announcer commentary), a camera array content source (e.g., video cameras capturing views of the playing area from different angles, video cameras capturing views of concession stands, merchandise stands, bathroom entrances), a venue broadcasts content source (e.g., satellite uplink trucks, network broadcasting equipment), and a venue display content source (e.g., JumboTron feeds).

In certain embodiments and as shown in FIG. 1, content from these sources may be communicated to at least the SVA and VOD services via a format conversion (FC) service. The FC service may be configured to convert the format of content received from content sources into one or more formats compatible with the SVA and VOD services, for example. In one such embodiment, content output by one or more content sources in a high definition television (HDTV) format may be converted to one or more of Quicktime, RealPlayer, and Windows Media Player formats or any other format suitable for embodying real-time and/or pre-recorded video content in connection with the SVA and VOD services, respectively. The content sources are discussed in further detail below in connection with the SVA, VOD and miscellaneous services.

In addition to content sources for outputting video and/or audio content for use with the SVA, VOD and miscellaneous services, the system may further comprise one or more content sources for outputting non-video content. In one embodiment, for example, the system may comprise one or more web feed content sources (e.g., Really Simple Syndication (RSS) web feeds) in communication with the one or more non-video services. In this way, accessing a non-video service via the wireless communication device may cause non-video content (e.g., news, weather, stock quotes, sports scores) to be pushed to a browser of the wireless communication device, integrated with other browser content, and refreshed as web feed content source(s) are updated. Non-video content sources may additionally or alternatively comprise content sources relating to the sporting event and/or the sports venue. In one embodiment, for example, content sources for providing schedules of the sports teams participating in the sporting event, team roster information, their team statistics and player biographies may be accessed via non-video services. Information pertaining to the venue, such as, for example, restrooms and concession stand locations near a particular seating area, the length of their lines, and schedules of upcoming events, may similarly be accessed. In certain embodiments, at least a portion of the non-video content may be provided in the form of navigable web pages, for example.

Other content sources of the system may be accessible through the one or more miscellaneous services and include, for example, game content sources (e.g., trivia games) and merchandising content sources.

The content sources are discussed in further detail below in connection with the SVA, VOD and miscellaneous services.

Credential Authentication and Revocation

In certain embodiments, access to and use of the services via the wireless communication devices may be subject to one or more restrictions. In one embodiment, for example, use of the services may require a spectator to pay a service fee at a venue location immediately prior to the event. Alternatively, a spectator may receive services for multiple venue events (e.g., all hockey games for a season) on a subscription basis. In addition to pay-to-use restrictions, access to and use of the services may be subject to copyright restrictions prohibiting some or all of the service-based content from being transmitted or otherwise used outside of the venue. In embodiments in which pay-to-use, copyright and/or other restrictions are in place, the system may comprise a credential authentication and revocation service including one or more servers configured to authenticate the credentials of a wireless communication device of a spectator who is entitled to receive the services, and to revoke the credentials at a later time.

In one embodiment, credential authentication may be performed subsequent to a spectator's payment of a required fee at a venue location by, for example, inputting identifying information (e.g., a device serial number) to the authentication and revocation service that uniquely identifies the spectator's wireless device. The identifying information may be input by an attendant at a venue kiosk, for example. In this way, the authentication and revocation service is able to recognize when a spectator is entitled to receive the services and may enable communication between the system and the wireless communication device as appropriate. It will be appreciated that the unique identifying information may also be provided by the spectator prior to his arrival at the venue (e.g., in connection with the purchase of a season ticket online). In certain embodiments, credentials may be revoked at the conclusion of the sports event or at the conclusion of the sports season, depending on the nature of a spectator's entitlement to services. Alternatively or additionally, credentials may be revoked if determined by the system that a spectator who is otherwise entitled to receive content is operating his wireless communication device outside of the venue or at a prohibited location within the venue. This determination may be based on, for example, the signal strength received from the wireless communication device as indicated by one or more of the WAPs and/or the triangulation of signals transmitted between one or more of the WAPs and the wireless communication device.

Distributed WAP Protocol

In certain embodiments, the WAPs may be positioned within the venue such that the services are accessible to the wireless communication devices regardless of their location within the venue. In other embodiments, the WAPs may be located such that the services are only accessible within one or more designated areas of the venue. Upon authentication of the credentials of a wireless communication device, the services may be accessible to the wireless communication device via the particular WAP through which authentication was performed. Because authentication for many wireless communication devices may be performed at locations within the venue (e.g., at venue entrances or venue locations where use of the services has been purchased) that are different from locations where the services will be predominantly used (e.g., spectator seats), communication traffic between wireless communication devices and the system may be unequally distributed across the WAPs. To address this condition, a distributed protocol may be implemented by the WAPs to coordinate the seamless hand-off of wireless communication devices from one WAP to another as the positions of wireless communication devices within the venue change, or as the signal paths within the venue change.

According to one embodiment, the distributed WAP protocol may be implemented across the WAPs by first measuring, within each WAP, the signal strength received from each wireless communication device. Each WAP may be configured to quantify received signal strengths based on the received signal strength indication (RSSI) standard, for example. Next, the measured signal strengths may be exchanged wirelessly between the WAPs and compared. The WAP measuring the largest signal strength for a given wireless communication device may then be selected to communicate with that device.

Figure 2B:
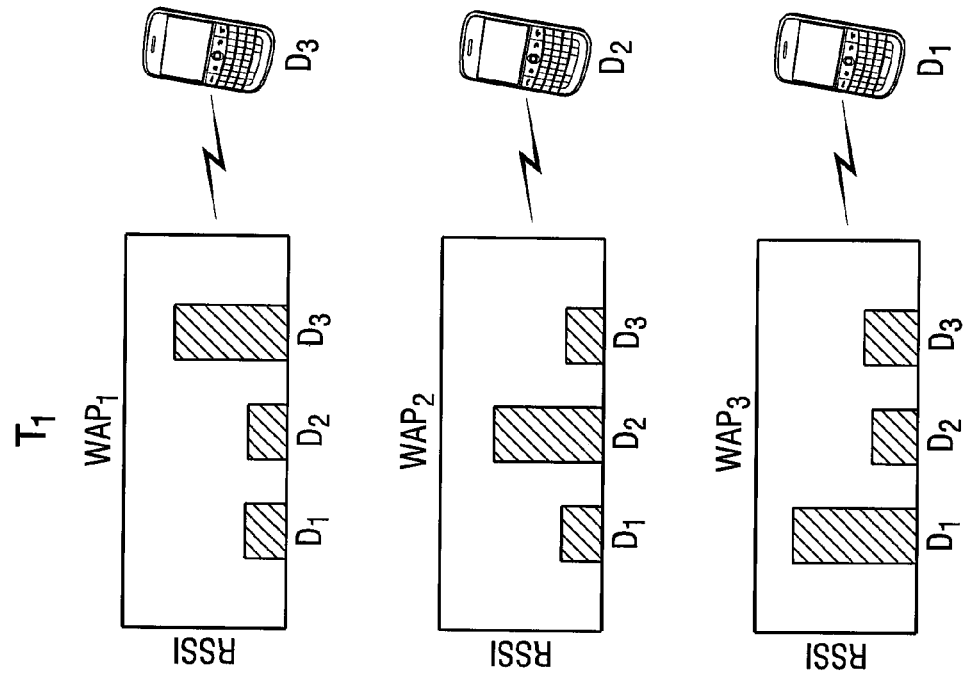
FIGS. 2A and 2B illustrate an implementation of a distributed wireless access point protocol according to one embodiment.
Figure 2A:
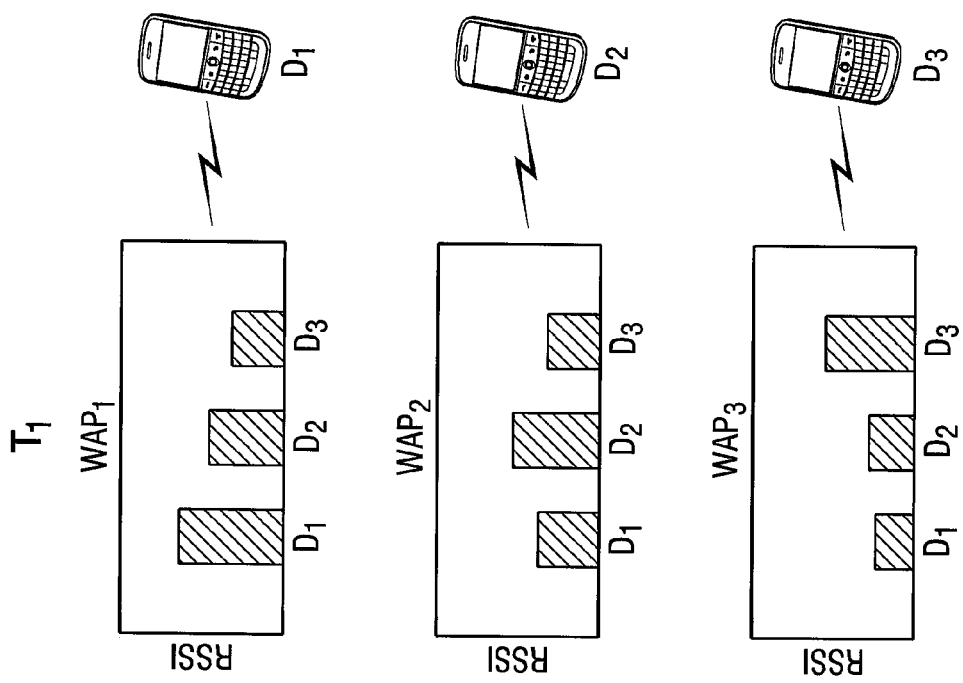

With reference to FIG. 2A, for example, the system may comprise WAPs 1-3 available for communicating with wireless communications devices D1-3. At a first point in time t1 for WAPs 1-3, the largest measured signal strengths correspond to devices D1-3, respectively. Accordingly, based on a comparison of signal strengths, WAPs 1-3 will be selected to communicate with wireless communications devices D1-3, respectively. FIG. 2B illustrates the signal strengths measured by the WAPs at a later time t2, with WAPs 1-3 now measuring the largest signal strengths for wireless communication devices D3, D2 and D1, respectively. It will be appreciated that such changes in signal strength may be caused by, among other things, changes in wireless communication device positions relative to the WAPs and/or changes in wireless signal paths within the venue. In accordance with the distributed WAP protocol, WAPs 1-3 are now selected to communicate with wireless communication devices D3, D2 and D1, respectively. In this way, communication bottlenecks that might otherwise result from unequal distribution of communication traffic across the WAPs may be avoided.

In certain embodiments, in order to prevent overly-frequent hand-offs between WAPs when one or more of the measured signal strengths for a particular wireless communication device is fluctuating (e.g., when a wireless communication device is being moved from one location to another within the venue), the distributed WAP protocol may be implemented such that the comparison of signal strengths for a wireless communication device is performed only after the corresponding measured signal strength measured by one or more of the WAPs falls within a pre-determined stability threshold (e.g., less than 5% variation) for a pre-determined period of time (e.g., one minute). Moreover, when a hand-off of a wireless communication device between WAPs is to be made in accordance with the distributed WAP protocol, the WAP from which communication is to be transitioned may maintain communication with the wireless communication device until it receives a confirmation that a successful hand-off has been made, thus ensuring that services being accessed by the wireless communication device are not interrupted by the transition.

As an alternative to coordinating the hand-off of the wireless communication devices between WAPs using the distributed WAP protocol, each wireless device may instead coordinate its own hand-offs by first measuring the signal strength from each WAP and then requesting its association with the WAP having the largest measured signal strength.

Wireless Communication Device and Graphical User Interface

Each wireless communication device may generally be any type of mobile communication device (e.g., a mobile phone or personal digital assistant (PDA)) capable of wirelessly communicating with the system to receive at least one of the services therefrom. In certain embodiments, as discussed above, the wireless communication devices may be configured to communicate with the system via a Wi-Fi network. Examples of suitable Wi-Fi enabled devices include, for example, the iPhone 3G and the iPod touch, available from Apple Computer Inc., of Cupertino, Calif., the Nokia 6300, available from Nokia Corporation, of Espoo, FI, and the BlackBerry Bold 9000, available from Research In Motion Limited, of Ontario, CA. The wireless communication device may comprise suitable browser software (e.g., Safari, available from Apple Computer Inc., Series 40, available from Nokia Corporation, Opera Mobile, available from Opera Software, of Oslo, Norway) for supporting a graphical user interface (GUI) through which the services may be accessed.

In certain embodiments and as discussed in further detail below, because the services provided by the system are browser-based, the wireless communication device does not require a separate software application or a specialized hardware configuration to access the services. Accordingly, for such embodiments, spectators may use their own browser-equipped wireless communication devices to access the services without the need for software or hardware modifications. As an alternative to the use of spectator-owned wireless communication devices, wireless communication devices owned by the venue or another entity may be rented or loaned to spectators upon their arrival at the venue.

Figure 3:
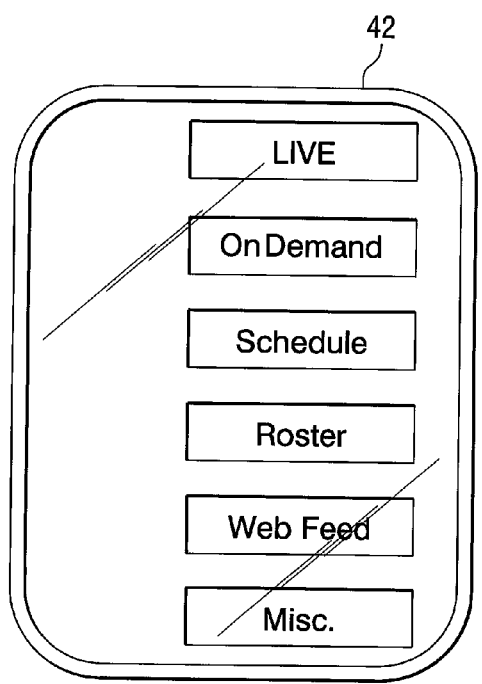
FIGS. 3 and 4 illustrate graphical user interface screens according to one embodiment.

FIG. 3 illustrates an introductory screen of a graphical user interface (GUI) 42 displayed by a browser of a wireless communication device subsequent to its authentication by the authentication and revocation service, according to one embodiment. The GUI may comprise a number of hierarchical screens for accessing, interacting with, and navigating between the services. Depending on the type of wireless communication device, interaction with the GUI may be performed via a touch screen or a keyboard of the device, for example. As shown in FIG. 3, selections displayed on the introductory screen may comprise a "LIVE" selection to access features of the SVA service, an "On Demand" selection to access features of the VOD service, a "Web Feed" selection, a "Schedule" selection, and a "Roster" selection to access features of the non-video services, and a "Miscellaneous" selection to access features associated with the miscellaneous services. Sub-screens and other content associated with each of these selections are discussed below.

Streaming Video/Audio (SVA) Service

The SVA may output one or more streams of real-time (e.g., live) video and/or audio content to the WAPs, which in turn may transmit the content streams over the wireless communication network such that each may be accessed via a GUI of a wireless communication device. The real-time content streams may be output by the SVA based at least in part on content received by the SVA service from content sources via the FC service.

Referring to FIG. 1, the SVA service may comprise at least one physical streaming media server for executing one or more streaming media server applications to convert received content into one or more streams of real-time video and/or audio content. Examples of suitable streaming media server applications may include, for example, Windows Media Services and QuickTime Streaming Server. In one embodiment, for each discrete source of video and/or audio content of the content sources (e.g., a digital video camera of the camera array content source, a microphone of the control room content source), the SVA service may comprise a corresponding streaming media server application to generate a stream of content representative of the discrete source content. In another embodiment, for each discrete source of video and/or audio content of the content sources, the SVA service may comprise a number of different streaming server applications to generate multiple streams of identical, but differently formatted, content. For example, the FC service may convert the output of a discrete content source into a number of different formats (e.g., QuickTime, RealPlayer, and Windows Media Player formats), with each formatted output of the FC service being processed by a compatible streaming server application of the SVA service. A user of the wireless communication device may thus select from amongst the differently formatted streams of identical content based on browser format requirements.

Figure 4:

FIG. 4 illustrates a GUI screen 44 that may be displayed by the wireless communication device upon accessing the SVA service (e.g., by activating the "LIVE" selection of FIG. 3). As shown, the screen may comprise a list of real-time video and/or audio streams output by the SVA service that are available for selection by a spectator. Selection of a listed stream causes the associated content to be played via the screen and/or a speaker of the wireless communication device.

Figure 5:
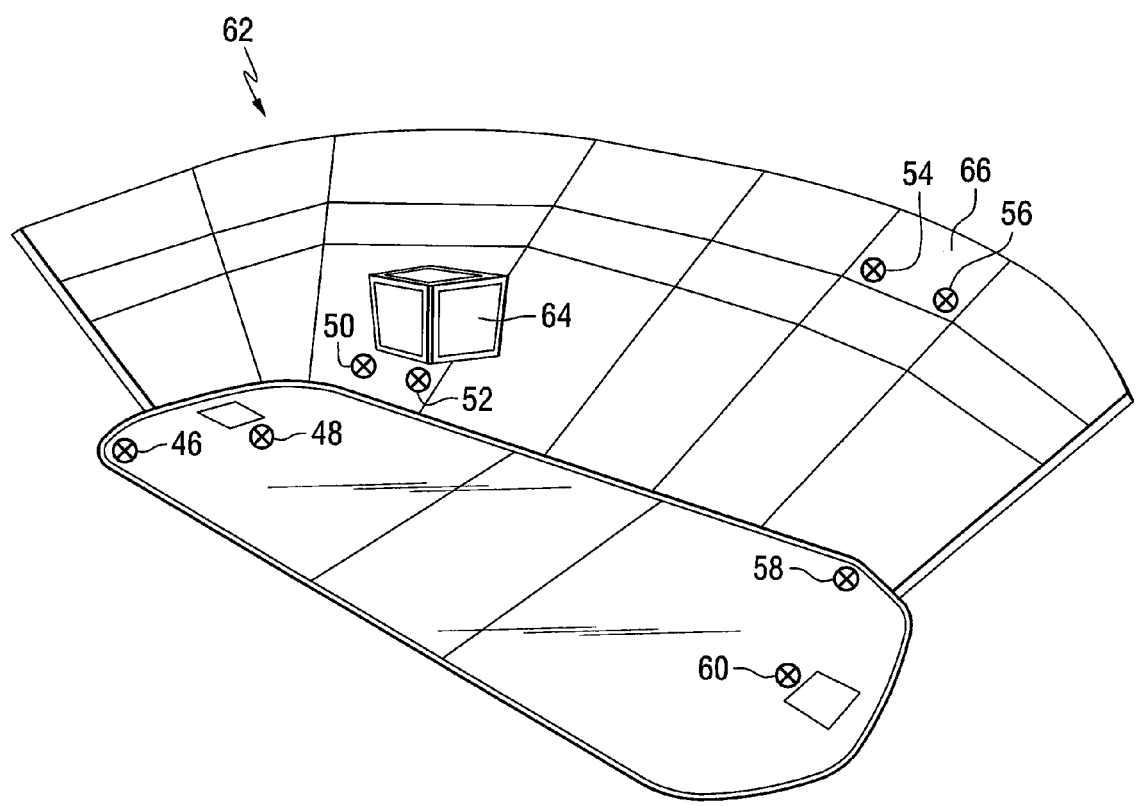
FIG. 5 illustrates an array of video cameras mounted in a sports venue according to one embodiment.

According to one embodiment, one or more streams listed on the screen may be associated with the camera array content source. In certain embodiments, the camera array content source may comprise a plurality of video cameras 46-60 located throughout the venue 62 for capturing real-time video and/or audio content that may be of particular interest to spectators. In one embodiment, for example, a number of video cameras may be mounted at locations throughout the venue for capturing views of the playing area from a corresponding number of angles. In FIG. 5, for example, video cameras are shown mounted at locations within a hockey arena to capture different views of the rink and adjacent areas. Such views may include, for example, views of the rink from one or more board positions, net positions, overhead display positions (e.g., positions on a JumboTron display 64), and seat positions 66. Although not shown in FIG. 5, video cameras may alternatively or additionally be located on the hockey players (e.g., as helmet-mounted cameras) to provide views from a player perspective.

In other embodiments, a number of video cameras may be mounted at locations throughout the venue suitable for capturing views unrelated to playing area activity. In one such embodiment, for example, video cameras may be mounted near concession stands, merchandise stands and restrooms so that a spectator can determine the accessibility of these venue facilities at any point in time during the sporting event. As used in this description, a venue is not limited to a particular site, building, place, structure, arena, or location, but may include multiple sites. For example, in Olympic Games, a venue might encompass multiple arenas hosting different sports.

In certain embodiments, one or more video cameras of the camera array content source may be remotely controllable such the video camera may be swiveled, refocused or otherwise manipulated to capture views of particular interest. In one such embodiment, for example, one or more video cameras may be mounted on an overhead display (e.g., a JumboTron display) and be remotely controllable to capture different views of the playing area or different views of spectator seating areas.

In one embodiment, one or more of the real-time content streams listed on the screen may be associated with the control room content source, the venue broadcasts content source, and/or the venue displays content source. The control room content source may comprise one or more discrete sources of real-time video and/or audio output, such as, for example, live video footage of the sporting event or control room personnel (e.g., a network personality) captured by one or more control room cameras, audio footage of an announcer observing the game from the control room, and video clips and graphics (e.g., replays and highlights from the sporting event, player interviews, graphics of player and team statistics, static or dynamic screen animations (e.g., sports teams and broadcast network logos)) output by control room equipment in connection with a commercial production of the sporting event. The venue broadcasts content source may comprise, for example, one or more discrete sources of real-time video and/or audio content broadcast by an entity (e.g., a local news team or national broadcasting network) present at the venue in connection with the sporting event. Such content may be received, for example, from a satellite uplink truck or other communication equipment used for broadcasting video and/or audio content via wireless or wire line communication channels. The venue displays content source may comprise one or more discrete sources of real-time video and/or audio content output to displays and/or sound system within the venue. Such content may include video and/or audio content fed to a JumboTron display, for example.

In various embodiments, selection of a real-time content stream listed on the screen may cause the associated content to be played continuously. In other words, the video and/or audio content of the selected stream continuously reflects the real-time content received from the corresponding content source. In other embodiments, the SVA service may modify the real-time content received from a content source by inserting pre-recorded content. Accordingly, although the content stream received by the wireless communication device is uninterrupted, the stream received by the wireless communication device is a hybrid of real-time content and pre-recorded content. In certain embodiments, the pre-recorded content may be inserted automatically based on the identification of an insertion cue by the SVA service.

Figure 6:
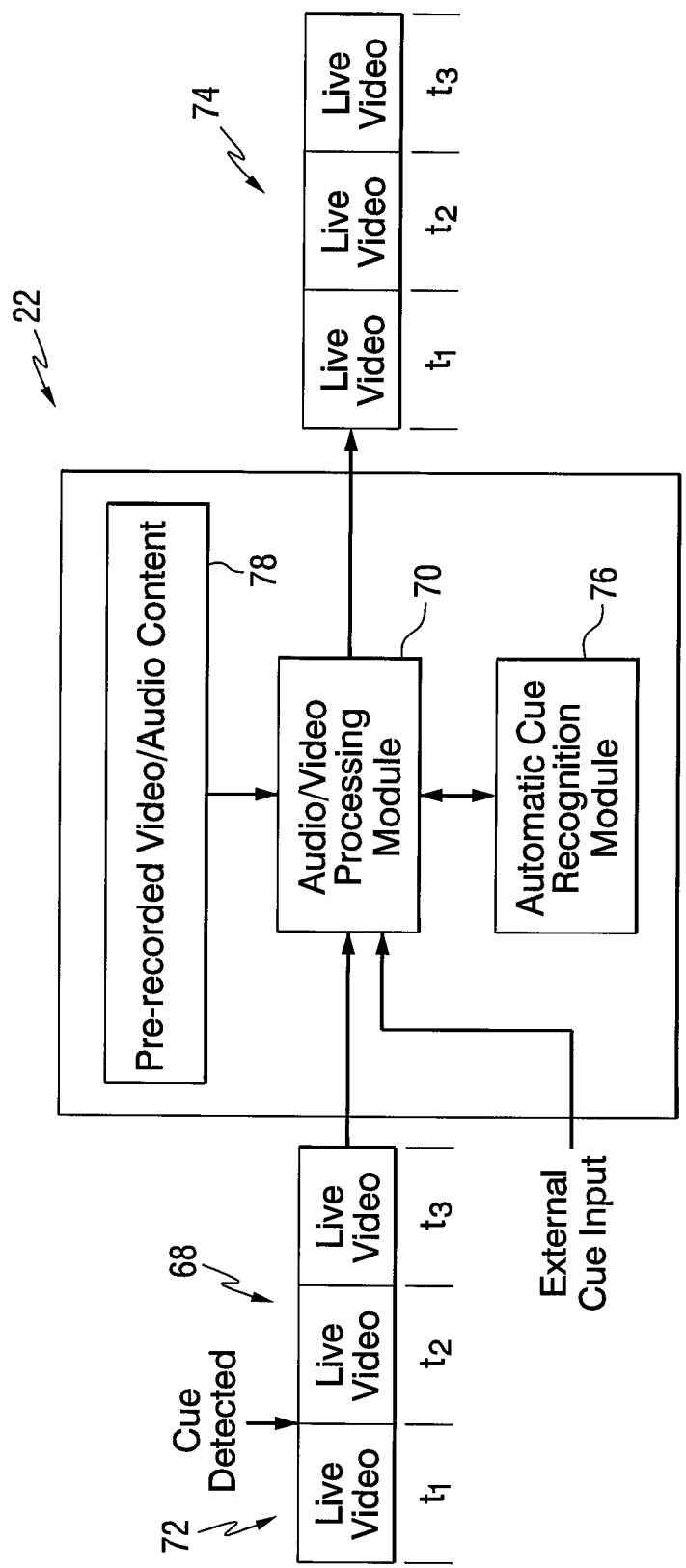
FIG. 6 illustrates a configuration of the streaming video/audio service according to one embodiment.

FIG. 6 illustrates a configuration of the SVA service for inserting pre-recorded content responsive to an insertion cure 68, according to one embodiment. As shown, the SVA service may comprise an audio/video processing module 70 for receiving real-time content (e.g., live video 72) and for outputting a real-time content stream 74 based on the received content. The SVA service may further comprise an automatic cue recognition module 76 for monitoring incoming content and for communicating an insertion cue to the audio/video processing module responsive to the detection of one or more pre-defined events embodied by the incoming content. In certain embodiments, pre-defined events may be identified by the automatic cue recognition module based on the application of video and audio recognition algorithms to the incoming content. Detection of a pre-defined event may indicate that real-time content to be received for a period of time subsequent to the detection of the pre-defined event may be of little interest to the spectator. For example, an image showing an empty playing area, or audio containing sounds such as a whistle, buzzer, crowd cheers, or certain spoken words or phrases (e.g., "timeout", "Smith has scored again!") may be classified by the automatic cue recognition module as predefined events that indicate an approaching lull in meaningful game activity for a predictable amount of time. An insertion cue communicated to the audio/video processing module responsive to detection of a pre-defined event causes the audio/video processing module to seamlessly replace live content that would otherwise be output to the wireless communication device with an item of pre-recorded content 78. The item of pre-recorded content may be sequentially selected from a cue of pre-recorded content items stored in the SVA or elsewhere and, in certain embodiments, may be unrelated to the pre-defined event that triggered the insertion. For example, the inserted content may comprise an advertisement for goods or services associated with an event sponsor. In other embodiments, the inserted content may depend on the nature of the pre-defined event. In one such embodiment, for example, a scoring event associated with a particular team may cause an advertisement for the scoring team's merchandise to be displayed. Additionally or alternatively, the inserted content may be selected based on its duration. For example, in cases where the pre-defined event is associated with a significant lull in game activity (e.g., a serious player injury), pre-recorded content of a longer duration may be selected for insertion.

After the pre-recorded content has played in its entirety, the audio/video processing module may resume the output of real-time content. In certain embodiments, inserted pre-recorded content that is in progress can be interrupted if determined by the automatic cue recognition module that meaningful game activity has resumed.

Video-On-Demand (VOD) Service

The VOD service may output one or more streams of pre-recorded video and/or audio content responsive to a corresponding one or more content requests received from the wireless communication devices. The output streams are communicated to the WAPs, which in turn transmit each content stream to the GUI of the requesting wireless communication device via the wireless communication network.

Referring to FIG. 1, the VOD service may comprise at least one physical streaming media server for executing one or more streaming media server applications to stream pre-recorded items of video and/or audio content to a wireless communication device responsive to a request received therefrom. Examples of suitable streaming media server applications may include, for example, Windows Media Services and QuickTime Streaming Server. Although not necessary, the VOD service may comprise storage media for storing some or all of the pre-recorded video and/or audio content.

Figures 7, 8:
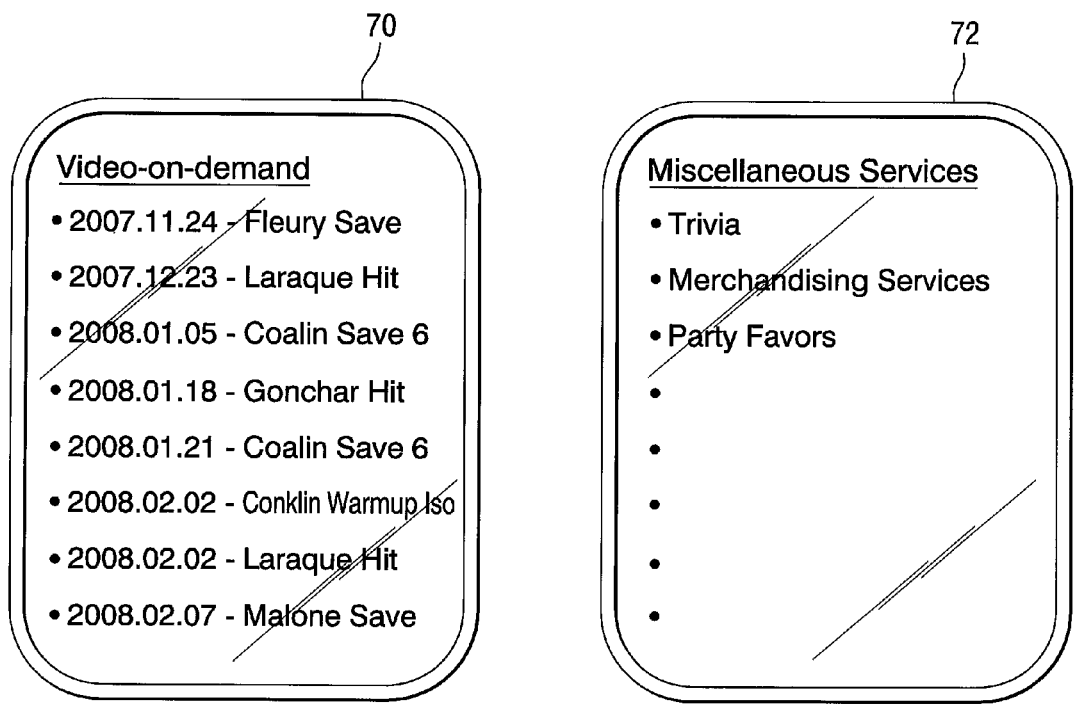
FIGS. 7 and 8 illustrate graphical user interface screens according to one embodiment.

FIG. 7 illustrates a GUI screen 70 that may be displayed by the wireless communication device upon accessing the VOD service (e.g., by activating the "On Demand" selection of FIG. 3). As shown, the screen may comprise a list of pre-recorded items of video and audio content that are available to be streamed by the VOD service to the wireless communication device. Selection of any of the listed items may cause the associated content to be played via the screen and/or a speaker of the wireless communication device.

In certain embodiments, one or more of the pre-recorded items of video and audio content listed on the screen may represent highlights of the sporting event or other event activities of particular interest to spectators. Examples of such content may include, for example, significant plays, controversial referee calls, scoring events, and player fights. According to various embodiments, at least a portion of the pre-recorded content associated with the VOD service may be derived from content previously processed by the SVA service. In certain of these embodiments, by virtue of the fact that video of the sporting event has been captured from multiple vantage points, a single highlight or event activity may be represented by multiple items of content listed on the screen, with each item corresponding to a view of the highlight or activity from a different angle. Accordingly, the highlight or activity may be visualized from multiple perspectives, thus enhancing the spectator's viewing experience.

In certain embodiments, pre-recorded items of video and/or audio content may be manually generated by control room personnel during the normal course of their production efforts (e.g., generating replays and highlights to be shown on a venue display or broadcast in connection with a network broadcast). Alternatively or additionally, pre-recorded items of video and/or audio content may be specifically generated for the VOD service by administrators of the system. In other embodiments, VOD content may be generated automatically. For example, automated video tagging systems for monitoring close-captioned text or speech may be employed in the control room or elsewhere to identify items of particular interest (e.g., Stanley Cup champions)

and to isolate a portion of the corresponding video (e.g., a portion of the video preceding and following the identified item by ten seconds).

Non-Video Services

The non-video services may output items of non-video content responsive to content requests received from wireless communication devices. The output content may be communicated to the appropriate WAPs, which in turn may transmit the content to a GUI of the requesting wireless communication device.

FIG. 8 illustrates a GUI screen 72 that may be displayed by the wireless communication device upon accessing the non-video services. According to various embodiments, the non-video services may comprise one or more servers for receiving or otherwise accessing non-video content from external content sources (e.g., web feed content sources providing news, weather, stock quotes, sports scores) and for pushing the content to a browser of the requesting wireless communication device. The transfer of such information may be initiated by activating the "Web Feed" selection of the introductory screen (FIG. 3), for example.

Additionally or alternatively, the non-video services may also comprise one or more servers for hosting non-video content sources. As discussed above, such content sources may comprise, for example, content sources relating to the sporting event, such as, for example, the schedules of the sports teams playing in the venue, their roster information (FIG. 3), team statistics, and player biographies. Other non-video content sources may relate to the venue and output information such as, for example, restroom and concession stand locations, and schedules for upcoming events. In certain embodiments, the hosting server(s) may comprise a web server configured to provide requested non-video content in the form of navigable web pages.

FIG. 9 is a schematic representation of another embodiment of the invention. In the embodiment of FIG. 9, the streaming service 22, video-on-demand service 24, non-video services 26, and miscellaneous services 28 would receive content as shown in FIG. 1. However, in FIG. 9, the content is delivered to a satellite uplink 74 and relayed via a satellite 76 to a receiver 78. A browser enabled wireless communication device 80 interacts with the receiver, for example via a WiFi connection to retrieve content from the receiver for display on the wireless communication device or on a separate display 82. The wireless content can be stored on web pages that are accessed by the wireless communication device through the receiver, and the web pages are then displayed on a display.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and, therefore, a more detailed description of such elements is not provided herein.

Any element expressed herein as a means for performing a specified function is intended to encompass any way of performing that function, including, for example, a combination of elements that performs that function. Furthermore, the invention, as may be defined by means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more propagated computer-readable media.

Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative in practical embodiments of the present invention, such substitution is within the scope of the present invention. Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

The invention claimed is:

1. A method of delivering video content, comprising:
   receiving video content from a plurality of content sources, wherein the plurality of content sources provide images of an event at a venue from multiple viewing perspectives;
   monitoring information associated with the video content;
   identifying automatically by a server occurrences of a plurality of event activities based on the information, wherein events embodied in the video content are classified based on the plurality of event activities;
   identifying by the server is based on an automatic cue recognition module;
   isolating by the server portions of the video content preceding and following the occurrences of each of the plurality of event activities;
   automatically generating, from the portions of the video content, a plurality of video on demand items, wherein each video on demand item corresponds to an event activity of the plurality of event activities and comprises images of the event activity from at least one of the multiple viewing perspectives;
   receiving, from at least one of one or more wireless communication devices located within the venue where the event is taking place, a request to view one of the video on demand items from one of the multiple viewing perspectives; and
   in response to receiving the request, transmitting the images corresponding to the requested video on demand item and viewing perspective to the wireless communication device in a format that allows the device to display the images on a display screen of the device.

2. The method of claim 1, wherein the content sources comprise one or more of:
   video from a control room;
   video from a plurality of cameras;
   video from a television truck; and
   video from a venue display.

3. The method of claim 1, further comprising outputting an indication of available video on demand items and viewing perspectives for each video on demand item to the one or more wireless communication devices.

4. The method of claim 1, further comprising permitting at least one of the one or more wireless communication devices to determine available video on demand items and viewing perspectives for each video on demand item.

5. The method of claim 1, further comprising transmitting the images associated with at least one video on demand item to at least one of the one or more wireless communication devices without first receiving from the at least one of the one or more wireless communication devices a request to view the video on demand item.

6. The method of claim 1, wherein each video on demand item comprises images of the event activity from two or more of the multiple viewing perspectives and the request to view one of the video on demand items from one of the multiple viewing perspectives includes a selection of one of the two or more of the multiple viewing perspectives.

7. The method of claim 1, wherein the available video on demand items and viewing perspectives are presented on a graphical user interface on the display screen of the one or more wireless communication devices.

8. The method of claim 1, further comprising:
   receiving a request for non-video content from one of the one or more wireless communication devices; and
   transmitting the requested non-video content to the one or more wireless communication devices.

9. The method of claim 8, wherein the non-video content comprises information about the event or the venue.

10. The method of claim 9, wherein the non-video content comprises one or more of:
    a schedule for a sports team playing at the venue;
    roster information about a sports team playing at the venue; and
    statistics related to a sports team playing at the venue.

11. The method of claim 9, wherein the non-video content comprises locations of restrooms or concession stands at the venue.

12. The method of claim 1, wherein the event activity is a scoring play at a sporting event.

13. The method of claim 1, further comprising:
    generating, from the video content, a plurality of real-time video streams, wherein each real-time video stream comprises images from one of the multiple viewing perspectives;
    providing an indication of available real-time video streams to the one or more wireless communication devices;
    receiving, from at least one of the one or more wireless communication devices, a request to view one of the real-time video streams; and
    in response to receiving the request, transmitting the requested real-time video stream to the wireless communication device in a format that allows the device to display the images of the real-time video stream on the display screen of the wireless communication device.

14. The method of claim 13, wherein the content sources comprise one or more of:
    video from a control room;
    video from a plurality of cameras;
    video from a television truck; and
    video from a venue display.

15. A system for delivering video content, comprising:
a format conversion system in communication with a plurality of content sources, wherein the plurality of content sources provide images of an event at a venue from multiple viewing perspectives;
one or more video on demand service servers; and
a plurality of wireless access points positioned at the venue configured to establish connections between at least one of the one or more video on demand service servers and a plurality of wireless communication devices located within the venue,
wherein the one or more video on demand service servers are configured to:
generate, from video content from the plurality of content sources, a plurality of video on demand items, wherein each video on demand item corresponds to an event activity and comprises images of the event activity from at least one of the multiple viewing perspectives, wherein each video on demand item is generated automatically by monitoring information associated with the video content, identifying automatically by a server an occurrence of the event activity based on the information, wherein events embodied in the video content are classified based on at least one event activity and identifying by the server is based on an automatic cue recognition module, and isolating by the server a portion of the video content preceding and following the occurrence of the event activity;
store the video on demand items; and
transmit, in response to receiving a request to view one of the video on demand items from a particular viewing perspective from one of the plurality of wireless communication devices, the images corresponding to the requested video on demand item and viewing perspective to the wireless communication device in a format that allows the device to display the images on a display screen of the wireless communication device.

16. The system of claim 15, wherein the content sources comprise one or more of:
video from a control room;
video from a plurality of cameras;
video from a television truck; and
video from a venue display.

17. The system of claim 15, wherein the one or more video on demand service servers are further configured to output an indication of available video on demand items and viewing perspectives for each video on demand item to the one or more of the plurality of wireless communication devices.

18. The system of claim 15, further comprising a streaming video service server, wherein the streaming video service server is configured to:
generate, from the video content, a plurality of real-time video streams, wherein each real-time video stream comprises images from one of the multiple viewing perspectives;
provide an indication of available real-time video streams to the one or more wireless communication devices;
transmit, in response to receiving a request to view one of the real-time video streams from at least one of the plurality of wireless communication devices, the requested real-time video stream to the at least one of the plurality of wireless communication devices in a format that allows the device to display the images of the real-time video stream on the display screen of the wireless communication device.

19. The system of claim 15, further comprising a non-video services server, wherein the non-video services server is configured to deliver non-video content to at least one of the plurality of wireless communication devices.

* * * * *